(12) United States Patent
Rotzoll

(10) Patent No.: US 6,750,846 B2
(45) Date of Patent: Jun. 15, 2004

(54) SENSING DEVICE FOR OPTICAL POINTING DEVICES SUCH AS AN OPTICAL MOUSE

(75) Inventor: Robert R. Rotzoll, Cascade, CO (US)

(73) Assignee: EM Microelectronic - Marin SA, Marin (CH)

( * ) Notice: Subject to any disclaimer, the term of this patent is extended or adjusted under 35 U.S.C. 154(b) by 232 days.

(21) Appl. No.: 10/001,959

(22) Filed: Dec. 5, 2001

(65) Prior Publication Data

US 2003/0103037 A1 Jun. 5, 2003

(51) Int. Cl.[7] .................................................. G09G 5/08
(52) U.S. Cl. ........................ 345/157; 345/158; 345/166; 345/175
(58) Field of Search ................................. 345/156, 157, 345/158, 163, 165, 166, 167, 175; 178/18.09; 341/31; 250/221

(56) References Cited

U.S. PATENT DOCUMENTS

| 4,920,260 | A | 4/1990 | Victor et al. |
| 5,288,993 | A | 2/1994 | Bidiville et al. |
| 5,703,356 | A | 12/1997 | Bidiville et al. |
| 6,256,016 | B1 * | 7/2001 | Piot et al. .................... 345/166 |
| 6,303,924 | B1 * | 10/2001 | Adan et al. .................. 250/221 |
| 2002/0035701 | A1 * | 3/2002 | Casebolt et al. ............ 713/300 |

FOREIGN PATENT DOCUMENTS

GB          2 272 763 A1      5/1994

* cited by examiner

*Primary Examiner*—Dennis-Doon Chow
(74) *Attorney, Agent, or Firm*—Sughrue Mion, PLLC

(57) ABSTRACT

There is described a sensing device for an optical pointing device comprising a plurality of pixels, each one of the pixels comprising a photosensitive element for generating a pixel output signal in response to radiation reflected from an illuminated portion of a surface, the sensing device further comprising processing means for determining, based on said pixel output signals, a measurement of relative motion between the sensing device and the illuminated surface and for generating cursor control signals based on this measurement. The sensing device further comprises circuit means for summing the pixel output signals of subsets of pixels including at least two pixels and for generating, for each of the subsets of pixels, a summed output signal, the processing means determining the measurement of relative motion based on the summed output signals.

19 Claims, 7 Drawing Sheets

SENSING DEVICE FOR OPTICAL POINTING DEVICES SUCH AS AN OPTICAL MOUSE

FIELD OF THE INVENTION

The present invention generally relates to pointing devices, in particular for controlling the position of a cursor on a screen, such as the display of a personal computer, workstation or other computing devices having a graphic user interface. Such pointing devices may for instance include mice, trackballs and other computer peripherals for controlling the position of a cursor on a display screen.

The present invention more particularly relates to the field of optical pointing devices which comprise an optical sensing device including a photodetector array for measuring the varying intensity pattern of a portion of a surface which is illuminated with radiation and for extracting information about the relative motion between the photodetector array and the illuminated portion of the surface.

BACKGROUND OF THE INVENTION

Optical pointing devices are already known in the art. U.S. Pat. No. 5,288,993, which is incorporated herein by reference, for instance discloses a cursor pointing device utilizing a photodetector array and an illuminated target ball having randomly distributed speckles. U.S. Pat. No. 5,703,356 (related to the above-mentioned U.S. Pat. No. 5,288,993), which is also incorporated herein by reference, further discloses (in reference to FIGS. 23A and 23B of this document) an optical cursor pointing device in the form of a mouse which does not require a ball and wherein light is reflected directly from the surface over which the pointing device is moved.

The imaging technique used in above-cited U.S. Pat. No. 5,288,993 and 5,703,356 in order to extract motion-related information is based on a so-called "Edge Motion Detection" technique. This "Edge Motion Detection" technique essentially consists in a determination of the movement of edges (i.e. a difference between the intensity of pairs of pixels) in the image detected by the photodetector array. Edges are defined as spatial intensity differences between two pixels of the photodetector array. The relative motion of each of these edges is tracked and measured so as to determine an overall displacement measurement which is representative of the relative movement between the photodetector array and the illuminated portion of the surface.

More particularly, according to U.S. Pat. No. 5,288,993, edges are determined between pairs of pixels aligned along a first axis of the photodetector array (for example in each row of the photodetector array) and between pairs of pixels aligned along a second axis of the photodetector array (for example in each column of the photodetector array). According to U.S. Pat. Nos. 5,288,993 and 5,703,356, the overall displacement measurement is evaluated based on a normalized difference between the number of edges which move in a first direction along the first axis and edges which move in the opposite direction along the first axis (for example edges which from left to right and right to left in each row of the photodetector array), and, on the other hand, based on a normalized difference between the number of edges which move in a first direction along the second axis and edges which move in the opposite direction along the second axis (for example edges which move downwards and upwards in each column of the photodetector array).

Relative motion of edges is determined by comparing the position of the edges in the photodetector array at a first point in time with the position of edges in the photodetector array at a subsequent point in time. The optical pointing device thus typically comprises a light source (such as an infrared LED) which intermittently illuminates the portion of the surface in accordance with a determined sequence, and the pixel outputs of the photodetector array are sampled in accordance with the determined sequence to provide two successive sets of edge data that are compared to each other in order to determine a relative motion measurement.

A problem of the above solutions, in particular with optical mice wherein radiation is reflected directly from the surface over which the pointing device is moved, resides in the fact that random surfaces (such as paper, wood, etc) have a lot of high spatial-frequency content. This high spatial-frequency content results in too much information (or noise) for the sensing device and a possible degradation of the quality and accuracy of the relative motion measurement extracted by the sensing device. In practice, the "Edge Detection Technique" disclosed in the above U.S. Pat. Nos. 5,288,993 and 5,703,356 has been applied with success to trackball devices wherein radiation is reflected from a surface having specific patterns, in this case a ball having a plurality of randomly shaped markings thereon in a color which contrasts with the background. The dimensions and density of these markings on the ball surface are selected for optimal determination of the relative motion measurement.

Accordingly, it is an object of the present invention to provide a solution that is better suited for application to optical pointing devices where radiation is reflected from random surfaces.

It is another object of the present invention to provide a solution that remains of simple design and construction.

SUMMARY OF THE INVENTION

According to a first aspect of the invention, there is provided a sensing device for an optical pointing device comprising a plurality of pixels, each one of the pixels comprising a photosensitive element for generating a pixel output signal in response to radiation reflected from an illuminated portion of a surface, the sensing device further comprising processing means for determining, based on the pixel output signals, a measurement of relative motion between the sensing device and the illuminated portion of the surface and for generating cursor control signals based on this measurement, wherein the sensing device further comprises circuit means for summing the pixel output signals of subsets of pixels including at least two pixels and for generating, for each of the subsets of pixels, a summed output signal, the processing means determining the measurement of relative motion based on the summed output signals.

There is also provided an optical point device including the above sensing device.

According to a preferred aspect of the invention, the circuit means for summing the pixel output signals include a plurality of distinct summing circuit means each associated with a distinct subset of pixels. Preferably, at least a first and a second subset of pixels overlap each other and include at least one common pixel.

According to the present invention, processing of the data is performed based on the sum of several pixel output signals. Such summing has an averaging and filtering effect which reduces high frequency spatial signals and thereby reduces spatial-frequency aliasing.

Other aspects, features and advantages of the present invention will be apparent upon reading the following detailed description of non-limiting examples and embodiments made with reference to the accompanying drawings.

DETAILED DESCRIPTION OF THE INVENTION

Figure 1:
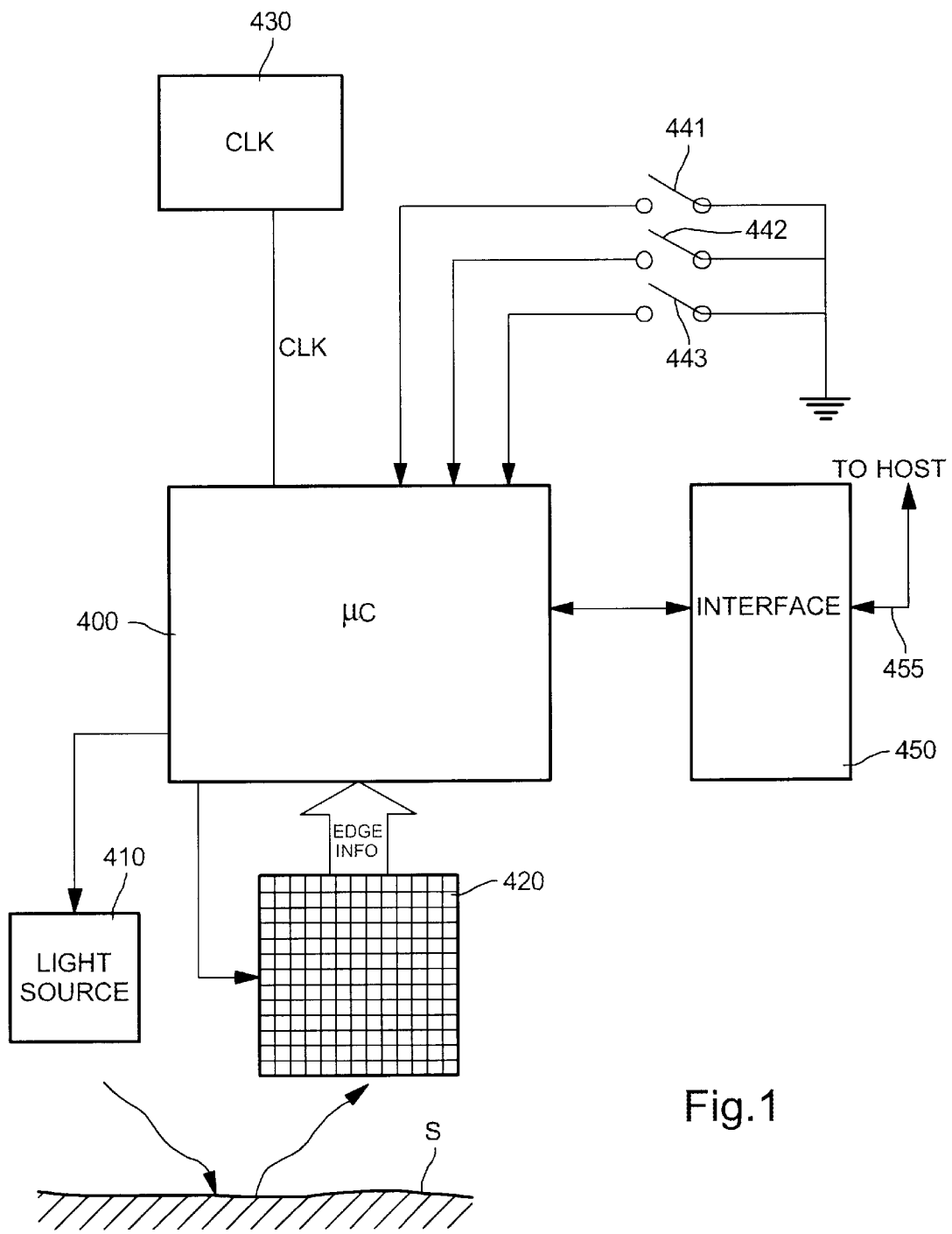
FIG. 1 is a schematic block diagram of an optical pointing device.
Figure 2:
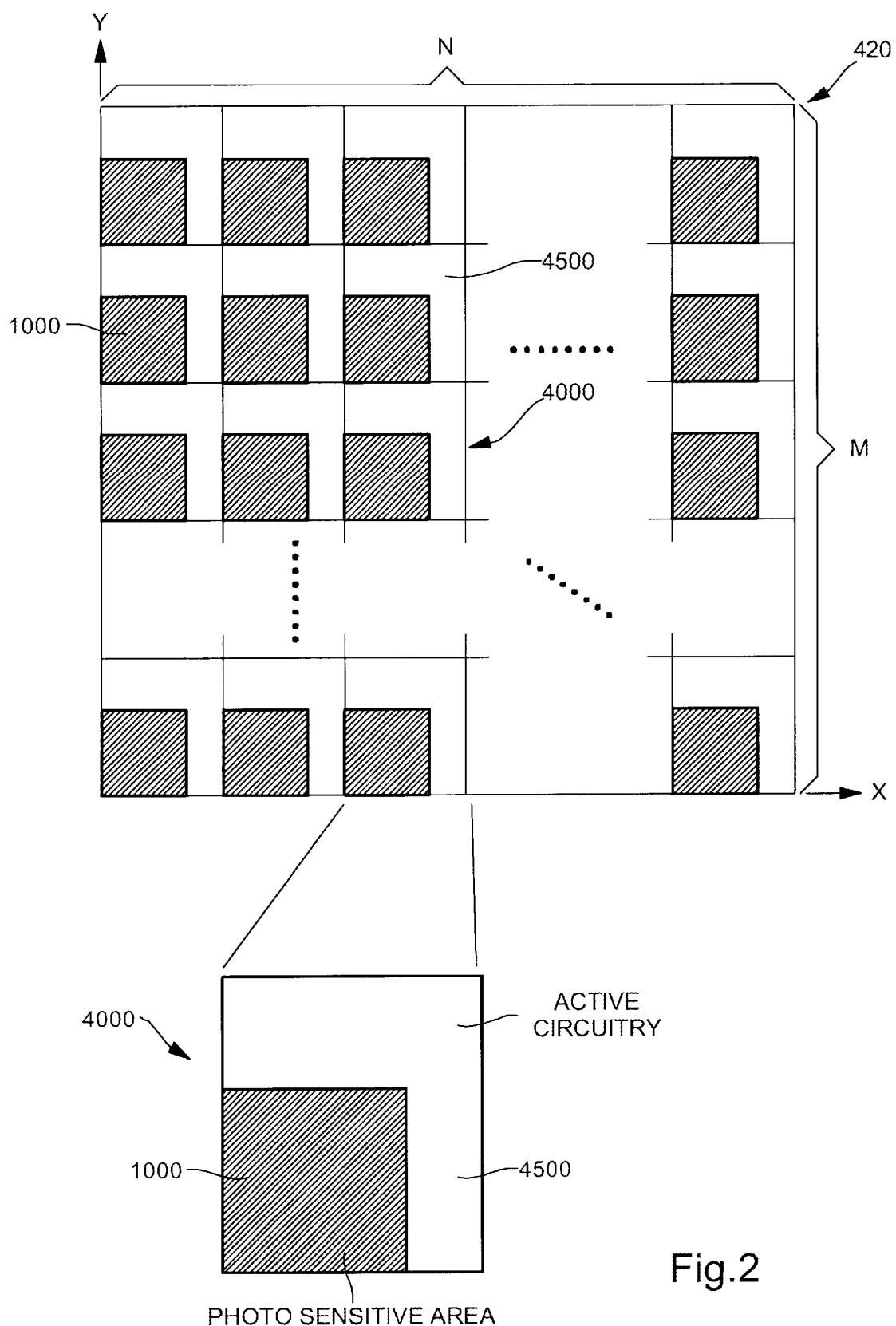
FIG. 2 is a schematic representation of a first example of the sensing device's photodetector array and pixel architecture.

FIG. 1 is a generalized schematic bloc diagram of an optical pointing device in accordance with the present invention. It comprises a photodetector array 420 including a plurality of pixels, this photodetector array 420 being connected to processing means 400 which consists, in a non limiting manner, of a micro-controller, microprocessor or other adequate logic circuitry for processing the signals outputted by the photodetector array 420. As schematically illustrated in FIG. 2, the photodetector array 420 is for instance a regular array, in this case square, having M pixel rows (parallel to axis x) and N pixel columns (parallel to axis y). A typical configuration is for instance a 15×15 pixels array. Each pixel of the photodetector array 420, designated by reference numeral 4000, essentially includes a photosensitive area 1000 forming a photodiode (or alternatively a phototransistor) and active circuitry 4500 including preamplifier means and comparator circuits for determining edge conditions between the pixel and at least one of his neighbours. This pixel active circuitry 4500 will be described hereafter in more detail.

Referring again to FIG. 1, the optical pointing device further comprises at least one light source 410 (or more) such as a LED, which produces radiation, preferably monochromatic (such as visible or non-visible light—preferably infrared light), that impinges on a portion of a surface S. Again, surface S may be a planar or non-planar surface such as the surface over which the pointing device is moved (as in the case of an optical mouse), the surface of ball (as in the case of an optical trackball) or any other suitable surface that may provide an appropriate intensity pattern for detection by the photodetector array 420. The optical pointing device typically comprises a window and eventually an optical arrangement (not illustrated) disposed between surface S, on the one hand, and light source 410 and photodetector array 420, on the other hand. These window and optical arrangements are typically designed to protect the optical components of the pointing device from dust and to focus the radiation emitted by light source 410 and the radiation reflected by the illuminated portion of surface S.

The optical pointing device further comprises clock means 430 for supplying a clock signal CLK to processing means 400. This clock signal CLK is used by processing means 400 to derive the necessary timing signals for the digital processing of data and for controlling the operations of photodetector array 420 and pulsing of light source 410. It will be appreciated that clock means 430 is not essential and that clock signal CLK may perfectly be supplied by the host to which the optical pointing device is connected (via the line interface 450).

Three switches 441, 442 and 443 further supply additional control inputs to processing means 400. Activation of these switches 441, 442, 443 is typically controlled by means of corresponding buttons located on the device's housing.

Processing means 400 is further adapted to communicate in a bi-directional manner with a line interface 450 that communicates in turn with a host system (not illustrated) over a bus 455. Cursor control signals (and eventually other signals related to the optical pointing device) are supplied to the host system over bus 455. Processing means 400 may also receive information, such as configuration signals, over bus 455 from the host system.

As briefly mentioned hereinabove, processing means 400 is essentially designed to intermittently sample the pixel outputs of photodetector array 420 in accordance with a defined sequence. The edge information of two successive samples is compared and a relative motion measurement is extracted by processing means 400. The adequate cursor control signals are then derived from the relative motion measurement and transmitted to the host system via line interface 450.

According to the present invention, the edge conditions, designated EDGE_X and EDGE_Y, along the first and second axes of the photodetector array are not determined directly based on a comparison of the pixel output signals of pairs of pixels (as in the prior art solution) but are determined based on a comparison of first and second signals resulting from the sum of several pixel output signals.

Circuit means are therefore provided for summing the pixel output signals of subsets of pixels and for generating, for each of these subsets of pixels, a summed output signal, the processing means determining the measurement of relative motion based on these summed output signals. Preferably, these circuit means include a plurality of distinct summing circuit means each associated with a distinct subset of pixels.

Figure 3:
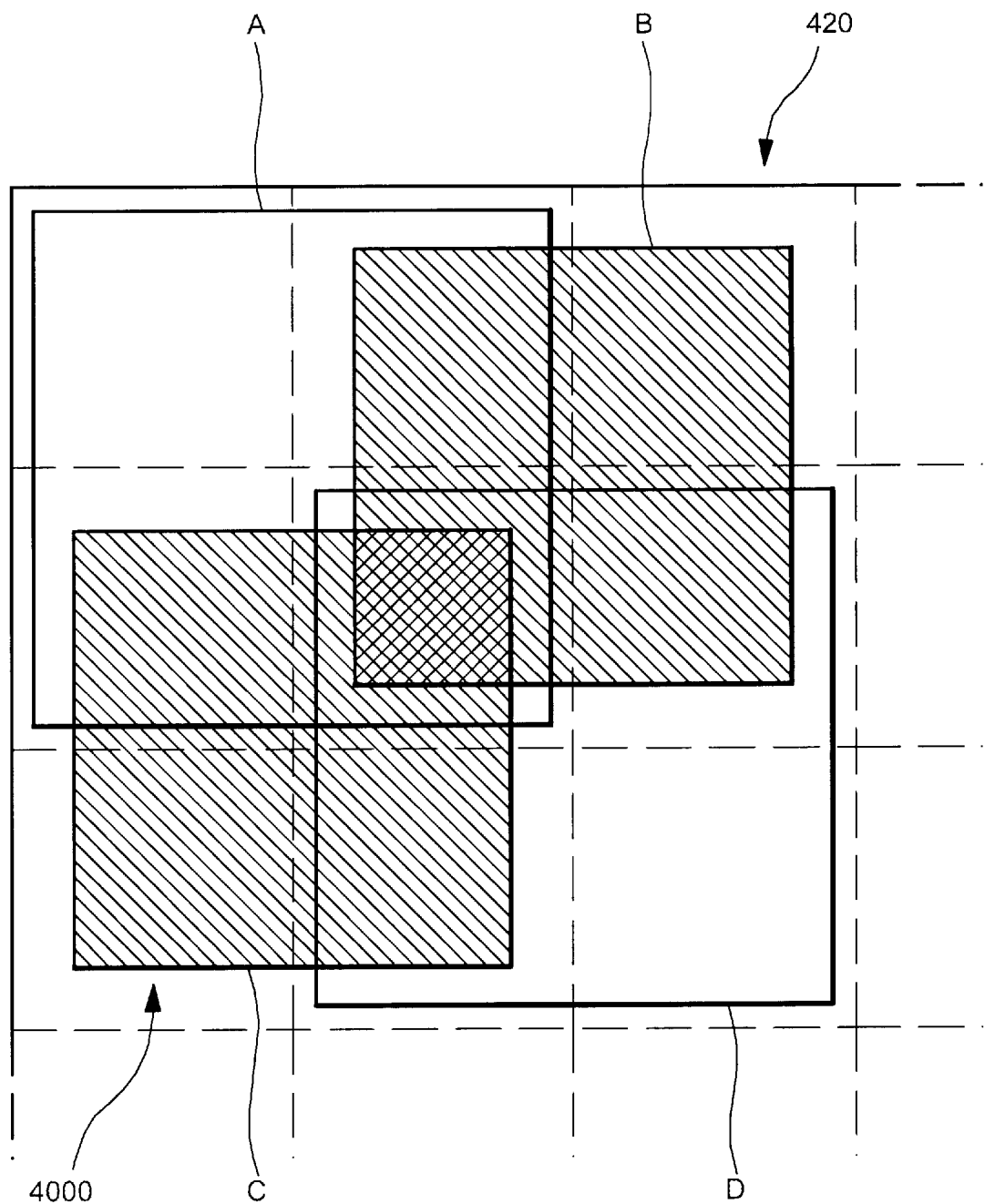
FIG. 3 illustrates a possible subdivision of the photodetector array of FIG. 2 in distinct overlapping subsets of pixels, each subset of pixels comprising a 2×2 pixels array associated with a distinct summing circuit means.

FIG. 3 schematically illustrates how the photodetector array 420 of FIG. 2 might be subdivided into distinct subsets of pixels. FIG. 3 only shows a 3×3 pixels portion of the photodetector array of FIG. 2. In this example, each subset of pixels is defined as a 2×2 pixels array, the FIG. illustrating only four of these subsets designated by references A, B, C and D. As shown in FIG. 3, subsets A, B, C, D (as well as the other subsets) are overlapping each other so that each subset shares at least one common pixel with another subset. In this specific example, each subset of pixels shares one or two pixels with the adjacent subsets.

It will be appreciated that the subsets may be defined so as to include any adequate number of pixels. In practice, this number is preferably to be selected in the range from 2 to 9 pixels, a greater number of pixels per subset being perfectly possible. In addition, the subsets are not necessarily "square", i.e. defined as sub-arrays of the photodetector array. For instance, instead of defining each subset as 2×2 pixels arrays as illustrated in FIG. 3, one could define a subset as comprising five adjacent pixels forming a "+"-shaped arrangement and comprising a first "central" pixel and the four adjacent pixels located on both sides of this first pixel along the same row and same column. Alternatively, keeping a five pixel arrangement, each subset may be defined as a "X"-shaped arrangement comprising a first "central" pixel and the four adjacent pixels located on both sides of this first pixel along the two diagonals. Any other symmetric or non symmetric pixel arrangement may be envisaged.

Figure 5:
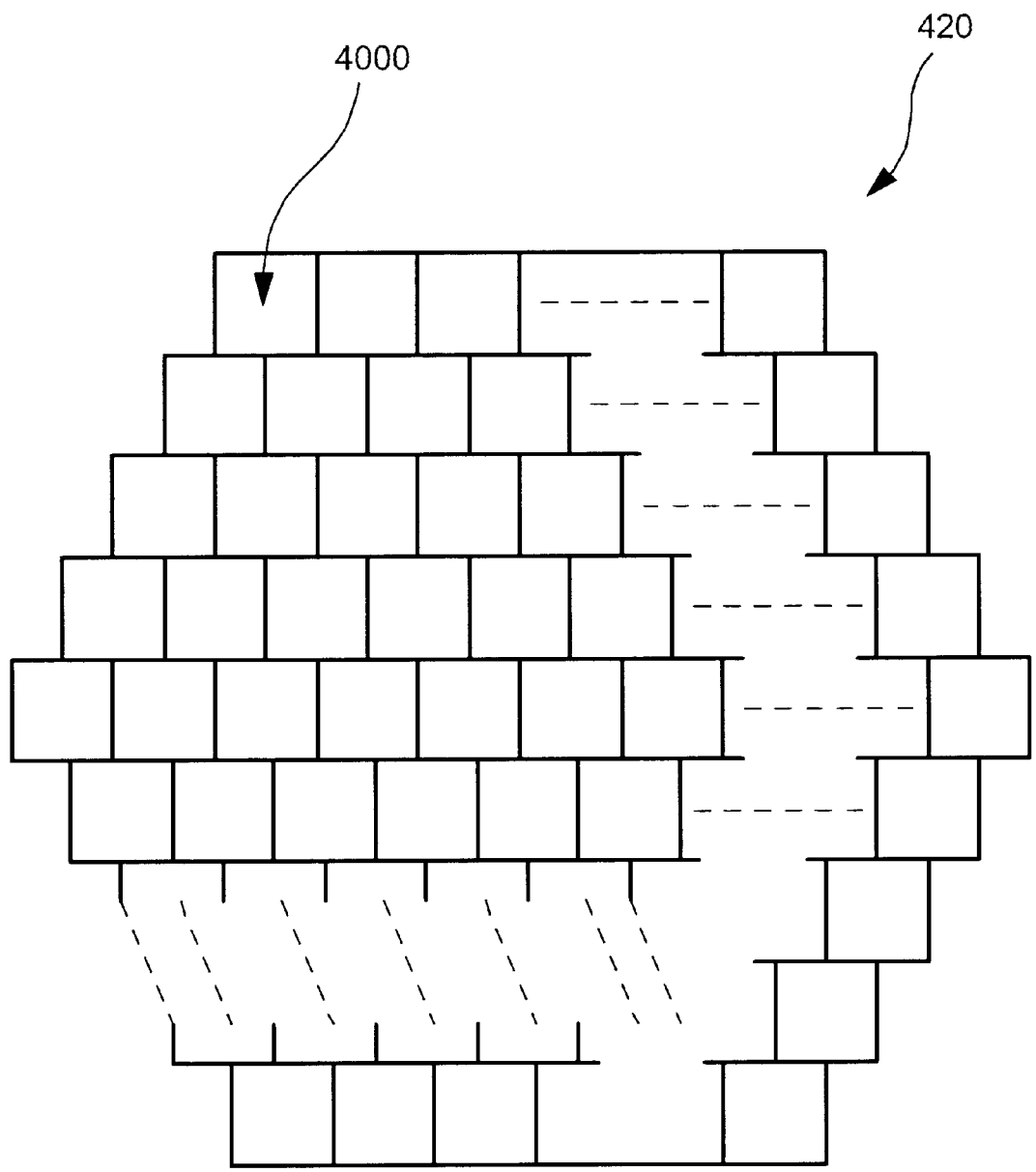
FIG. 5 illustrates another architecture for the photodetector array of FIG. 1 wherein the pixels are aligned along non-orthogonal axes.
Figure 6:
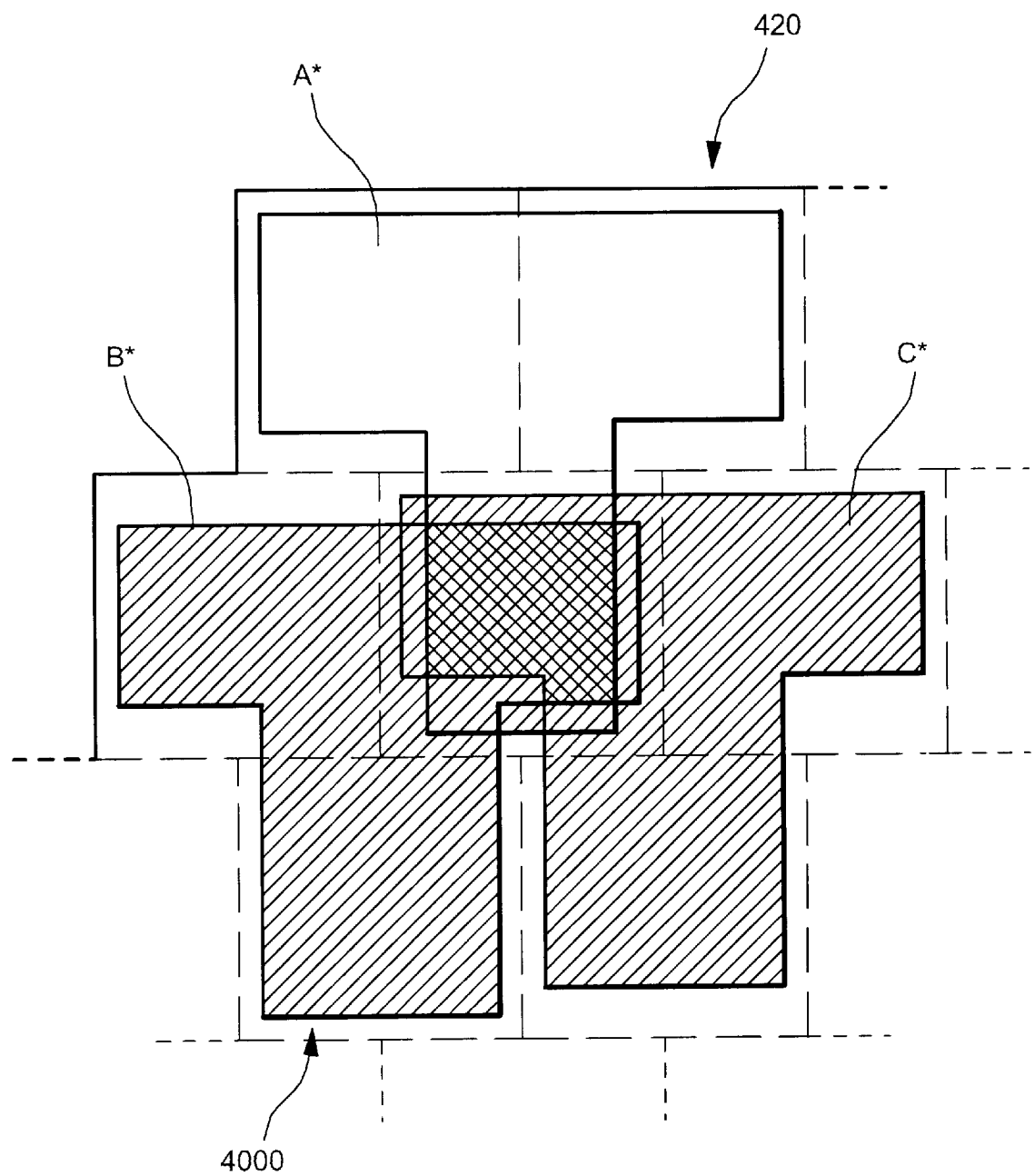
FIG. 6 illustrates a possible subdivision of the photodetector array of FIG. 5 in distinct overlapping subsets of pixels, each subset of pixels comprising three adjacent pixels.

It will also be appreciated that the photodetector array itself is not necessary "square". Pixels on the edges of the array may for instance be discarded or deactivated. As shown in FIG. 5, the photodetector array 420 may for instance be designed to have a substantially circular or polygonal outer perimeter. Moreover, the pixels might be aligned along first and second axes which are not orthogonal as illustrated in FIG. 5. In this case, each subset may conveniently be defined as comprising three adjacent pixels forming a "T"-shaped arrangement as shown in FIG. 6 which illustrates a portion of the photodetector array 420 of FIG. 5 and three overlapping subsets designated by references A*, B*, C*.

It will finally be appreciated that all subsets are not necessarily identical and may be different in shape and pixel number. For instance, adopting the five pixel "+"-shaped arrangement mentioned hereinabove, one will understand that the pixels located at the four corners of the photodetector array of FIG. 2 will not be included in any subset. Each of these four pixels may either be discarded, be included in one or all of the adjacent subsets (in which case these subsets would include six pixels instead of five) or be included in another subset, such as 2×2 pixels subset (for each corner). In the latter two cases, the summing circuit means associated with each of these "specific" subsets should be modified so that the summed output signal has the same "weight" as the summed output signals outputted by the other summing circuit means. This can for instance be achieved by appropriately selecting adequate resistance values for the resistive elements of the summing circuit of FIG. 7 which will be described hereafter.

Referring again to the subdivision principle of FIG. 3, it will be appreciated that, for a photodetector array comprising M rows and N columns of pixels and for subsets of pixels defined as arrays having a number m of rows and a number n of columns (m and n being respectively less than M and N), (M−m+1) times (N−n+1) subsets of pixels will be defined in such case. For instance, should the photodetector array 420 be a 15×15 pixels square array and each subset be a 2×2 pixels array as illustrated in FIG. 3, 14×14 distinct subsets of pixels will be defined.

Figure 4:
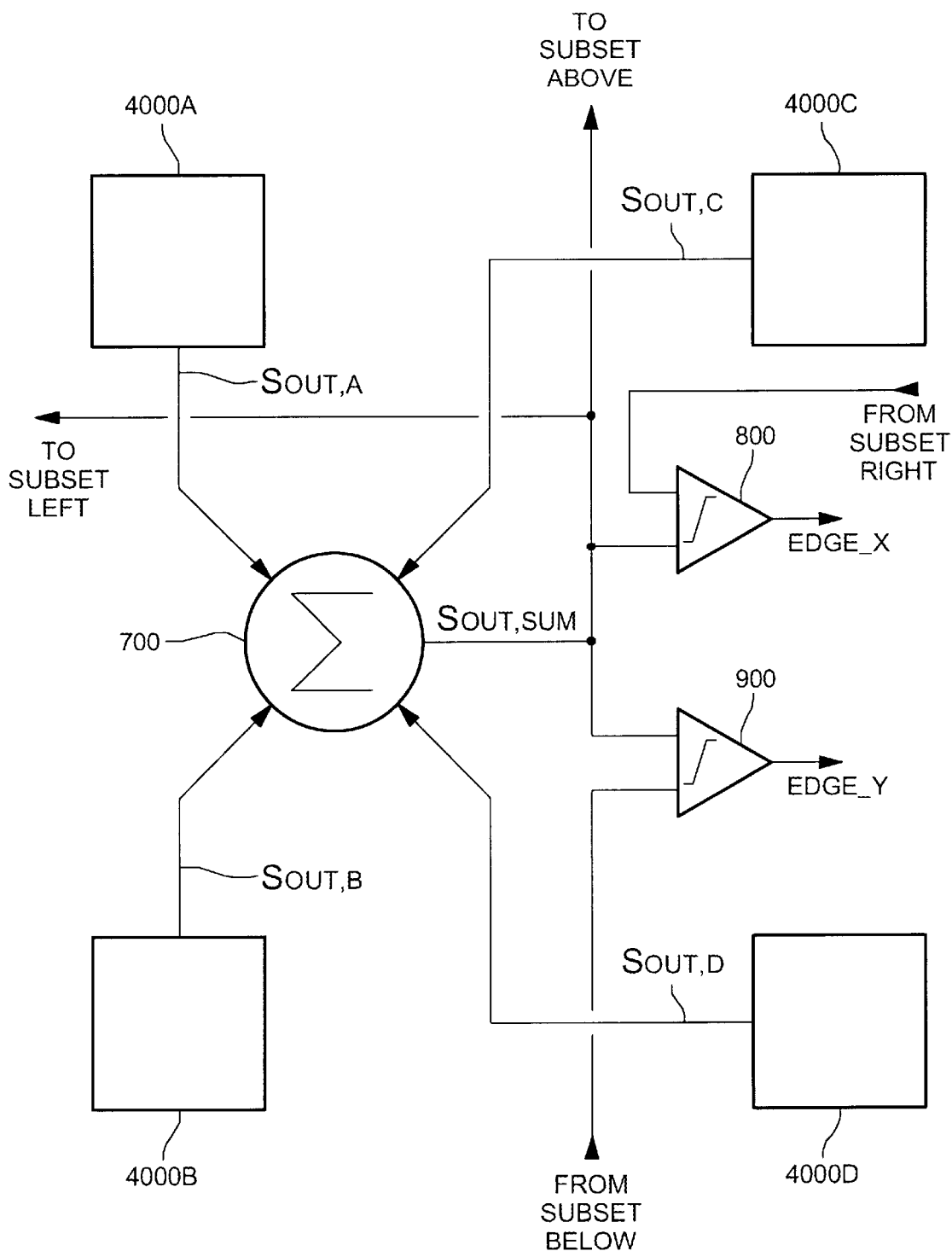
FIG. 4 is a schematic illustration of the implementation of the present invention for the subdivision of FIG. 3.

One will now refer to FIG. 4 which is a schematic illustration of four pixels 4000A to 4000C of a selected 2×2 pixels subset (as defined in FIG. 3) and the corresponding summing circuit means 700 for summing the pixel output signals SOUT,A to SOUT,D and generating a corresponding summed output signal, designated SOUT,SUM, this signal being supplied to comparison means 800, 900 for determining edge conditions EDGE_X and EDGE_Y using a similar technique as the one described in the above-cited U.S. Pat. Nos. 5,288,993 and 5,703,356. In this example, the edge detection principle is based on a comparison of the summed output signal SOUT,SUM of the current subset of pixels (including pixels 4000A to 4000D) with the summed output signal of the subset on the right (which includes pixels 4000C, 4000D and the two pixels on their right) using comparison means 800 and with the subset below (which includes pixels 4000B, 4000D and the two pixels below these pixels) using comparison means 900. The current subset also supplies its summed output signal SOUT,SUM to the subsets on its left and above as shown.

Although FIG. 4 only illustrates the active circuitry associated with a single subset of pixel, it will be appreciated that other subsets of pixels are associated with identical circuitry. It will also be appreciated that specific conditions are defined for the subsets located on the far right and bottom of the photodetector array, i.e. the subsets which do not have any adjacent subsets on their right and/or lower side.

Referring again to the pixel architecture schematically illustrated in FIG. 2, the active circuitry of FIG. 4 is advantageously to be formed within the active region of one of the pixel of the associated subset of pixels. For instance, the active circuitry 700, 800, 900 of FIG. 4 may conveniently be formed within the active region of pixel 4000A, the active circuitry associated with the subsets on the right side, lower side, and lower-right side being respectively formed within the active region of pixels 4000C, 4000B and 4000D.

Figure 7:
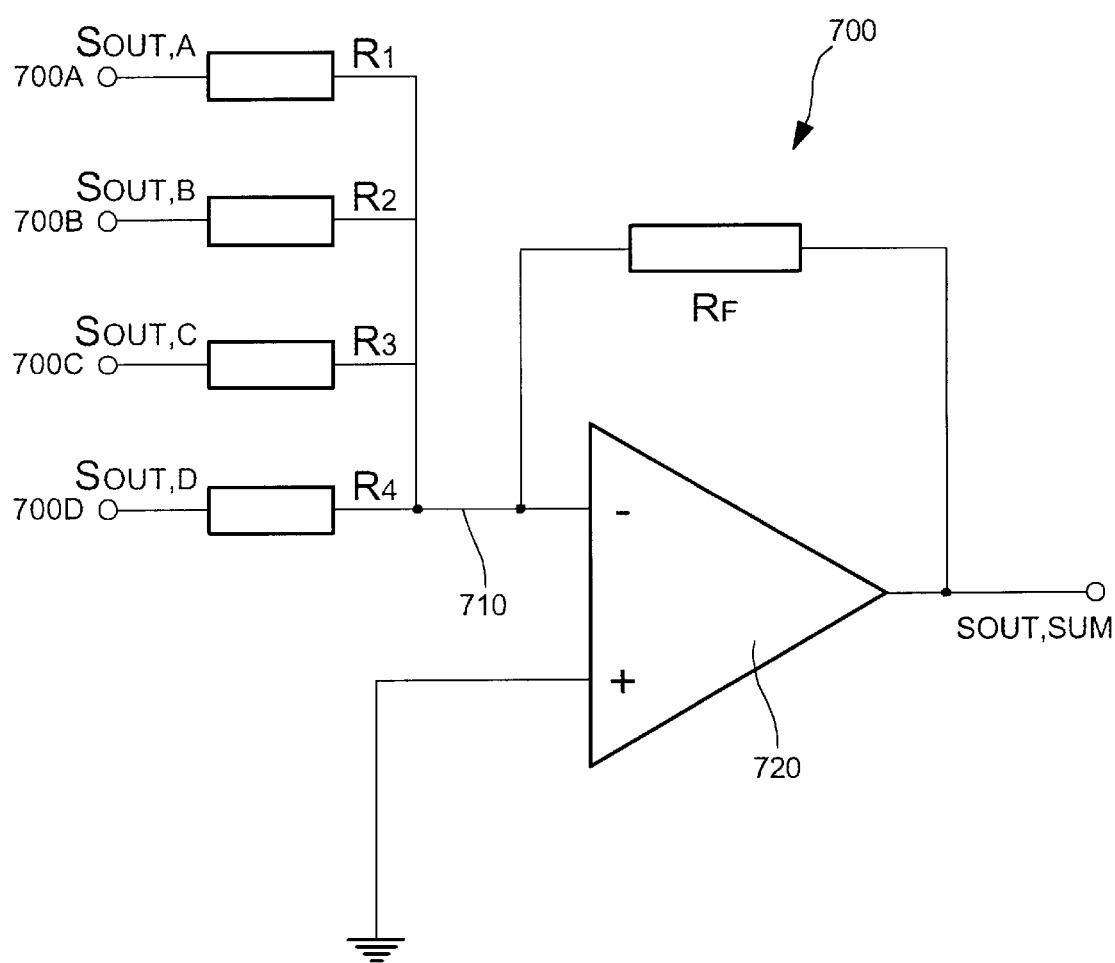
FIG. 7 is a schematic illustration of an example of a summing circuit means for summing the pixel output signals of four pixels.

Summing circuit means 700 may be realized in various different ways. For instance, assuming that pixel output signals SOUT,A to SOUT,D are voltage signals, a conventional summing circuit as illustrated in FIG. 7 might be used to generate the summed output voltage SOUT,SUM. As illustrated in the FIG., this summing circuit 700 includes a plurality of summing inputs 700A to 700D, an operational amplifier 720 and a feedback resistor or resistive element Rf. Each summing input comprises a resistive element R1, R2, R3, R4 having a first terminal supplied by a respective one of the output signals SOUT,A to SOUT,D and having a second terminal connected to a common summing node 710. The inverting input of the amplifier 720 is connected to the common summing node 710 while the inverting input is tied to a reference potential such as ground, the resistive element Rf being connected between the inverting input and the output of operational amplifier 720 which supplies the summed output voltage SOUT_SUM.

It will be appreciated that the summing circuit of FIG. 7 is given here purely for explanation purposes and that other circuit arrangements known to those skilled in the art could be used in order to fulfil the same function, i.e. summing the pixel output signals supplied by the pixel of each subset. In addition, the functions of summing circuit means 700 and comparator means 800, 900 may conveniently be merged to directly output the edge conditions EDGE_X, EDGE_Y.

As shown in FIG. 7, the basic principle for summing the pixel output signals is to convert (should the pixel output signals be voltage signals) these signals by means of resistive elements and to add these currents on a common summing node to generate a summed output current. This summed output current can directly be compared to the summed output current of another subset using current comparator circuits or may alternatively be converted to a voltage signal (as this is the case in the summing circuit of FIG. 7) and be compared with the voltage signal of another subset of pixels. Should the pixel output signals be current signals, each pixel output signal may simply be added on a common summing node. This may for instance be achieved by applying each pixel output signal on the input of a respective current mirror circuit and connecting the output branches of each pixel within a selected subset of pixels to a common summing node. Taking the subdivision example of FIG. 3, this would basically require, for each pixel (except the pixel on the edges of the photodetector array), a current mirror circuit having four output branches for each pixel, taking into account that one pixel may be included in up to four distinct subsets of pixels in this example.

Having described the invention with regard to certain specific embodiments, it is to be understood that these embodiments are not meant as limitations of the invention. Indeed, various modifications and/or adaptations may become apparent to those skilled in the art without departing from the scope of the annexed claims. For instance, the proposed embodiments are not necessarily limited to sensing devices comprising a regular array of pixels aligned along two orthogonal axes. Other pixel arrangements may be envisaged, such as pixel arrangements including pixels aligned along two (or more) non orthogonal axes as illustrated in FIG. 5.

In addition, the sensing device according to the present invention does not necessarily operate according to the edge detection principle of U.S. Pat. Nos. 5,288,993 and 5,703,356. For instance, the present invention is also applicable to the motion detection principle disclosed in U.S. Pat. Nos. 5,578,813 and 5,644,139 which is based on correlation of consecutive image frames outputted by the photodetector array. As a matter of fact, it will be appreciated that the present invention is not dependent on the motion detection principle which is applied.

What is claimed is:

1. A sensing device for an optical pointing device comprising a plurality of pixels, each one of said pixels comprising a photosensitive element for generating a pixel output signal in response to radiation reflected from an illuminated portion of a surface, said sensing device further comprising processing means for determining, based on said pixel output signals, a measurement of relative motion between said sensing device and said illuminated portion of the surface and for generating cursor control signals based on said measurement, wherein said sensing device further comprises circuit means for reducing spatial-frequency noise from the pixel output signals, said reducing means including circuit means summing the pixel output signals of subsets of pixels including at least two pixels and for generating, for each of said subsets of pixels, a summed output signal, said processing means determining said measurement of relative motion based on said summed output signals.

2. The sensing device of claim 1, wherein said circuit means include a plurality of distinct summing circuit means each associated with a distinct subset of pixels.

3. The sensing device of claim 2, wherein at least a first and a second subset of pixels overlap each other and include at least one common pixel.

4. The sensing device of claim 3, wherein said pixels are disposed so as to form an array having a number N of columns and a number M of rows and wherein each subset of pixels comprises an array having a number n of columns and a number m of rows, numbers n and m being respectively less than numbers N and M, said sensing device comprising (N−n+1) times (M−m+1) distinct subsets of pixels.

5. The sensing device of claim 4, wherein each subset of pixels comprises a 2×2 pixels array.

6. The sensing device of claim 2, wherein each pixel comprises a photosensitive region forming said photosensitive element and an active region including pixel circuitry for conditioning and outputting said pixel output signal, each distinct summing circuit means being formed inside the active region of one of the pixel of the associated subset of pixels.

7. The sensing device of claim 2, wherein said pixel output signals are voltage signals and wherein each distinct summing circuit means comprises a summing circuit including a plurality of resistive elements each having a first terminal connected to a respective one of the pixels of the associated subset of pixels and a second terminal connected to a common summing node.

8. An optical pointing device, comprising a light source for illuminating a portion of a surface with radiation;

a sensing device comprising a photodetector array including a plurality of pixels, each pixel comprising a photosensitive element for generating a pixel output signal in response to said radiation reflected from the illuminated portion of the surface; and processing means for determining, based on said pixels output signals, a measurement of relative motion between said photodetector array and said illuminated portion of the surface and for generating cursor control signals based on said measurement, wherein said sensing device further comprises means for reducing spatial-frequency noise from the pixel output signals, said reducing means including circuit means for summing the pixel output signals of subsets of pixels including at least two pixels and for generating, for each of said subsets of pixels, a summed output signal, said processing means determining said measurement of relative motion based on said summed output signals.

9. The optical pointing device of claim 8, wherein said circuit means include a plurality of distinct summing circuit means each associated with a distinct subset of pixels.

10. The optical pointing device of claim 9, wherein at least a first and a second subset of pixels overlap each other and include at least one common pixel.

11. The optical pointing device of claim 10, wherein said photodetector array has a number M of rows and a number N of columns and wherein each subset of pixels comprises an array having a number m of rows and a number n of columns, numbers m and n being respectively less than numbers M and N, said photodetector array comprising (M−m+1) times (N−n+1) distinct subsets of pixels.

12. The optical pointing device of claim 11, wherein each subset of pixels is a 2×2 pixels array.

13. The optical pointing device of claim 9, wherein said pixel output signals are voltage signals and wherein each distinct summing circuit means comprises a summing circuit including a plurality of resistive elements each having a first terminal connected to a respective one of the pixels of the associated subset of pixels and a second terminal connected to a common summing node.

14. A sensing device for an optical pointing device comprising a plurality of pixels, each one of said pixels comprising a photosensitive element for generating a pixel output signal in response to radiation reflected from an illuminated portion of a surface, said sensing device further comprising processing means for determining, based on said pixel output signals, a measurement of relative motion between said sensing device and said illuminated portion of the surface and for generating cursor control signals based on said measurement, wherein said sensing device further comprises means for reducing spatial-frequency noise from the pixel output signals, said reducing means including circuit means for summing the pixel output signals of subsets of pixels including at least three pixels and for generating, for each of said subsets of pixels, a summed output signal, said processing means determining said measurement of relative motion based on said summed output signals.

15. The sensing device of claim 14, wherein said circuit means include a plurality of distinct summing circuit means each associated with a distinct subset of pixels.

16. The sensing device of claim 15, wherein at least a first and a second subset of pixels overlap each other and include at least one common pixel.

17. The sensing device of claim 15, wherein each pixel comprises a photosensitive region forming said photosensitive element and an active region including pixel circuitry for conditioning and outputting said pixel output signal, each distinct summing circuit means being formed inside the active region of one of the pixel of the associated subset of pixels.

18. The sensing device of claim 15, wherein said pixel output signals are voltage signals and wherein each distinct summing circuit means comprises a summing circuit including a plurality of resistive elements each having a first terminal connected to a respective one of the pixels of the associated subset of pixels and a second terminal connected to a common summing node.

19. An optical pointing device, comprising: a light source for illuminating a portion of a surface with radiation;

a sensing device comprising a photodetector array including a plurality of pixels, each pixel comprising a photosensitive element for generating a pixel output signal in response to said radiation reflected from the illuminated portion of the surface; and processing means for determining, based on said pixels output signals, a measurement of relative motion between said photodetector array and said illuminated portion of the surface and for generating cursor control signals based on said measurement, wherein said sensing device further comprises means for reducing spatial-frequency noise from the pixel output signals, said reducing means including circuit means for summing the pixel output signals of subsets of pixels including at least three pixels and for generating, for each of said subsets of pixels, a summed output signal, said processing means determining said measurement of relative motion based on said summed output signals.

* * * * *